United States Patent [19]

Arthur

[11] 4,307,649
[45] Dec. 29, 1981

[54] SLIDE RULE FOR FRETTED MUSICAL INSTRUMENT

[76] Inventor: Amos Arthur, 931 Shelby St., Indianapolis, Ind. 46203

[21] Appl. No.: 182,059

[22] Filed: Aug. 28, 1980

[51] Int. Cl.³ .............................................. G10B 15/00
[52] U.S. Cl. ............................................... 84/485 SR
[58] Field of Search ........................ 84/485 SR, 485 R

[56] References Cited

U.S. PATENT DOCUMENTS 3,827,330  8/1974  Wood ......................... 84/485 SR X
4,175,468  11/1979  Whitlock ...................... 84/485 SR

*Primary Examiner*—Donald A. Griffin
*Assistant Examiner*—Benjamin R. Fuller
*Attorney, Agent, or Firm*—Woodard, Weikart, Emhardt & Naughton

[57] ABSTRACT

A slide rule device displays notes and chords of a fretted musical instrument and is used to visualize and teach the operation of instruments such as the pedal steel guitar. The device includes a number of side-by-side slide members positioned in a channeled housing, corresponding to strings on the musical instrument, and which may be moved longitudinally either singly or in groups. Such movement is accomplished by handles, foot peddles, or knee levers and corresponds to the tuning operation of foot peddles or knee levers on an actual pedal steel guitar or the like. Each slide member is returned to a neutral position, which is equivalent to no movement of foot peddles or knee levers, by longitudinal springs secured to the housing after a movement therein, and each has a sequential series of musical notes displayed upon its face corresponding to the notes available on the corresponding string of the simulated musical instrument. An indicator member positioned above the slide members displays those notes the respective strings (slide members) will produce at the corresponding fret (longitudinal position of the indicator) for a specific combination of pedal or lever depressions (slide movements).

11 Claims, 4 Drawing Figures

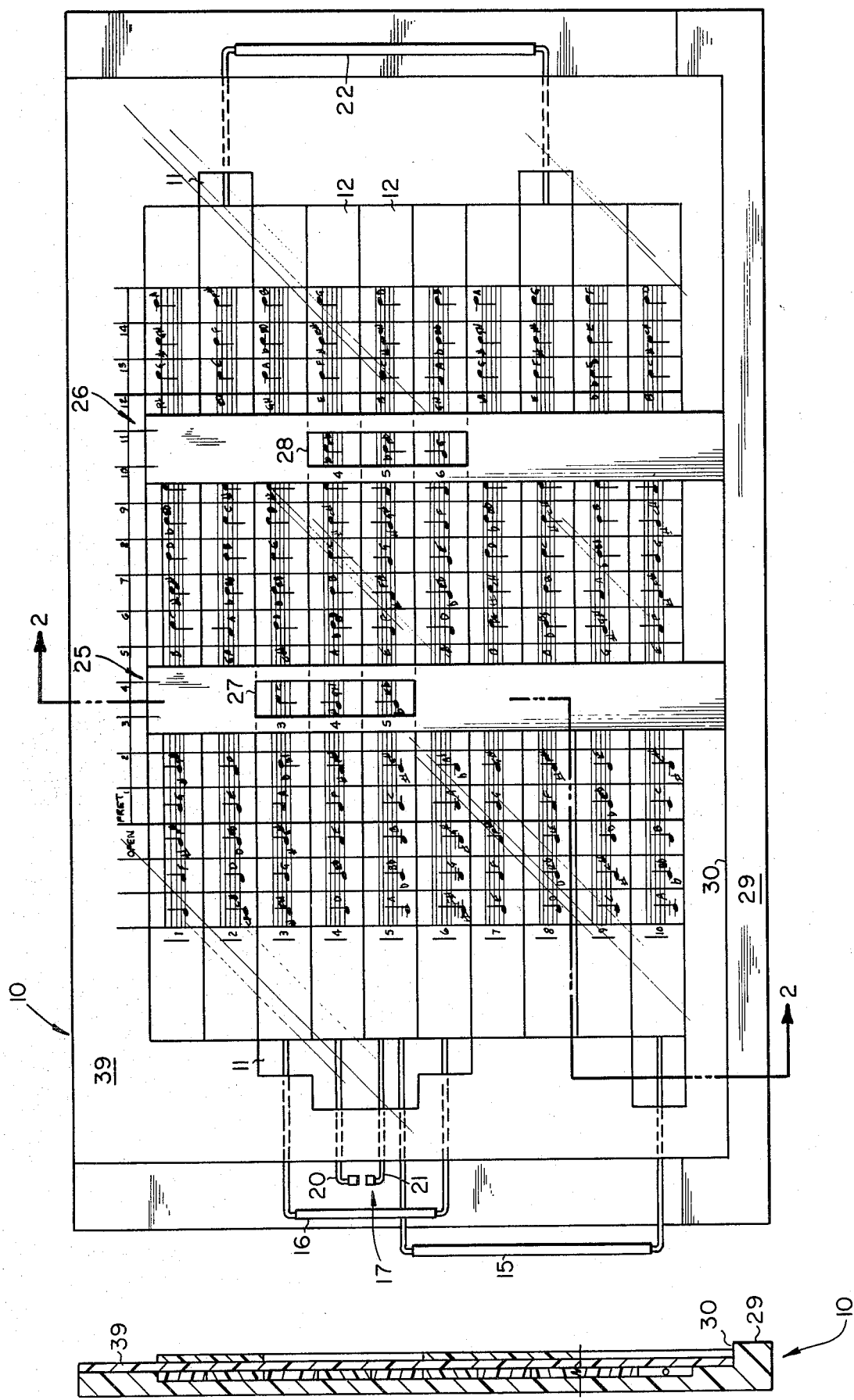

SLIDE RULE FOR FRETTED MUSICAL INSTRUMENT

BACKGROUND OF THE INVENTION

This invention relates to a device for the displaying of notes and chords of a fretted musical instrument such as, for example a pedal steel guitar.

Presently available pedal steel guitars are fretted stringed instruments generally including 10 to 28 strings, from 3 to 10 floor pedals and up to 10 knee levers. During operation of such instruments, the musician varies the pitch or tone of one or more strings by depressing or releasing a knee lever or floor pedal. It is difficult to visualize and to teach the notes constituting the chords produced by such foot pedal and knee lever operation because heretofore there has not been available a device capable of illustrating the operation of such fretted stringed instruments.

It is therefore an object of this invention to provide a slide rule device for visualizing the operation of a fretted stringed instrument such as a steel guitar.

Another object of this invention is to provide a slide rule device for teaching the operation of a pedal steel guitar.

SUMMARY OF THE INVENTION

One embodiment of the invention of the present invention might include a slide rule device for a fretted musical instrument having a plurality of tuned strings and means for changing the tuning of the strings. The slide rule includes a housing defining a plurality of side-by-side elongated channels each corresponding to a respective string of the instrument. There is also provided a plurality of side-by-side elongated slide members positioned in the channels. At least some of the slide members are longitudinally moveable. The housing includes stops limiting the longitudinal movement of the slide members. Each of the slide members has a plurality of notes inscribed thereon with the notes being distributed longitudinally along the slide members. The housing has fret marks inscribed thereon to indicate the frets of the musical instrument with the fret marks being distributed longitudinally relative to the channels. At least one handle is connected to at least one of the slide members for moving the slide member longitudinally and representing an element of the musical instrument intended for changing the tuning of at least one of the strings during the playing thereof. There is also provided an indicator member having an opening therethrough arranged to display the notes of a chord produced by a series of strings. The housing has a surface adapted do support the indicator member to extend over and perpendicular to the channel. The indicator member has marks adapted to be lined up with the fret marks on the housing so as to display through the opening the notes corresponding to respective frets.

BRIEF DESCRIPTION OF THE DRAWINGS

FIG. 1 is a front elevation of a slide rule device embodying the present invention.

FIG. 2 is a sectional view taken along the line 22 of FIG. 1 in the direction of the arrows.

DESCRIPTION OF PREFERRED EMBODIMENTS

Figure 3:
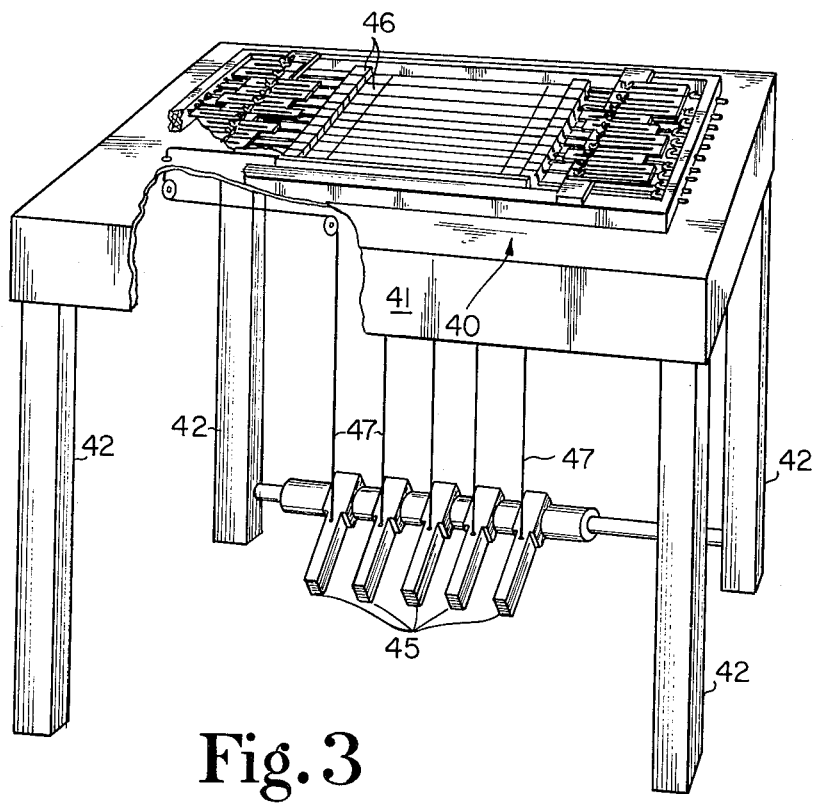
FIG. 3 is a perspective view of an alternative embodiment of the invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings and particularly to FIGS. 1 and 2, there is illustrated a slide rule device which includes a housing 10. The housing may be made of cardboard or the like and has a plurality of side-by-side channels 11 therein which correspond to respective strings of the instrument. A plurality of side-by-side elongated slide members 12 are positioned in the side-by-side channels. In the illustrated embodiment all but the first, seventh and ninth of these slide members are longitudinally moveable. Thus, the pedal steel guitar represented by the illustrated embodiment of the invention includes ten strings, nine of which the tone or pitch can be adjusted, either raised or lowered by movement of a foot pedal or a knee lever. The fifth slide member and the tenth slide member 12 are connected together by a handle 15 which represents the A foot pedal of the steel guitar. The third and sixth slide members 12 are connected together by a handle 16 which represents the foot pedal B of the steel guitar. Foot pedal C of the steel guitar is represented by the handle 17 which includes two separated parts 20 and 21, the part 20 being connected to the fourth slide member and the part 21 being connected to the fifth slide member.

A knee lever is represented by the handle 22 which connects together the second and eighth slide members. Each of the handles 15, 16, 17 and 22 are composed of flexible wire which has sufficient stiffness so that movement of the handle 15, 16, 17 and 22 either leftwardly or rightwardly, will also move the two slide members connected to the handle. It should be noted that the fifth slide member has two handles connected to it. Thus, the flexibility of the handle 15 and the extreme length of its central portion makes possible the fifth slide member being in a leftward position relative to the tenth slide member. The fact that the two portions 20 and 21 of the handle 17 are disconnected makes possible the relatively close fourth and fifth slide members each moving to a different position leftwardly and rightwardly without interference with one another.

It should be noted that the various musical notes set forth on the respective slide members increased in pitch from left to right. When the slide rule device is in the position illustrated in FIG. 1 with all of the slide members directly above one another in the illustrated position, the device is representing the steel guitar when the foot pedals and knee lever are not actuated. When any of the handles 15, 16 and 17, representing the foot pedals are pulled to the far leftward position, the slide members 12 illustrate the notes produced at a particular fret for a particular string. Similarly, a pulling of the handle 22 to the rightward position causing movement of the second and eighth slide members indicates the notes produced by the actuation of the knee lever.

A pair of indicator members 25 and 26 are provided and include openings 27 and 28 which display the notes of a chord produced by a series of strings. The housing 10 includes a projection 29 having a surface 30 which extends parallel to the channels and direction of movement of the slide members 12. The indicator members 25 and 26 are rectangular and extend perpendicularly from the surface 30 across the slide members in such a way that the openings 27 and 28 display the three notes involved in a particular chord which is played by the steel guitar when the particular appropriate handles 15, 16 17 and/or 22 are operated. Thus, in FIG. 1 the indicator member 25 is positioned so as to indicate the use of the third and fourth fret to produce a chord on the third, fourth, and fifth string at the fourth fret. This chord is being produced without the foot pedals or the knee lever being actuated. In the case of the indicator 26 the fourth, fifth and sixth string chord is shown at the eleventh fret with use of the frets 10 and 11 and with none of the foot pedals or knee lever being actuated.

A transparent plastic sheet 39 is provided for protecting the slide rule device against dirt and the like.

Figure 4:
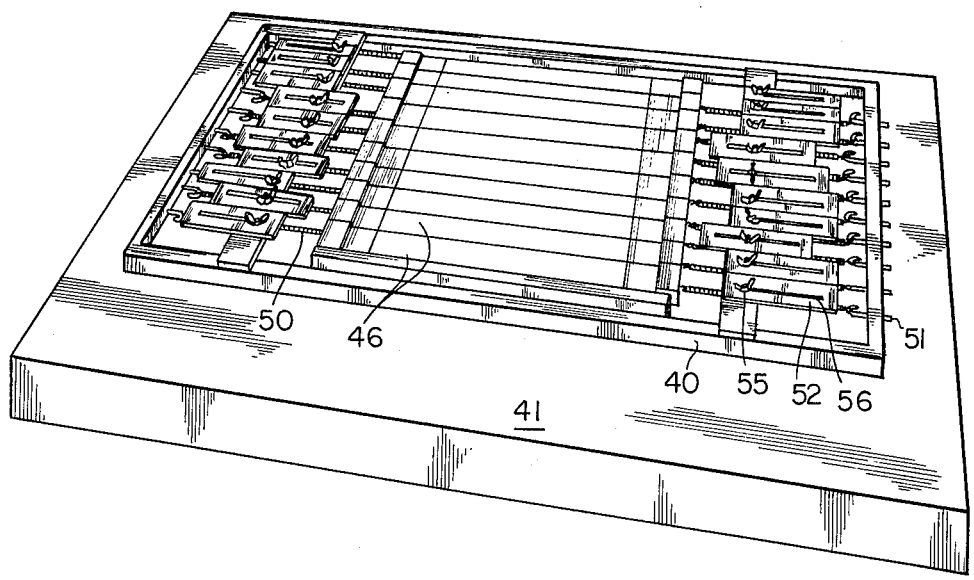
FIG. 4 is an enlarged view similar to FIG. 3 of the embodiment of FIG. 3.

Referring to FIGS. 3 and 4, there is illustrated an embodiment of the invention which is intended to more closely approximate the actual operation and appearance of the steel guitar. As illustrated, the housing 40 of the embodiment of FIGS. 3 and 4 is supported upon a table 41 by four legs 42 intended to closely approximate the height and arrangement of an actual steel guitar. The particular illustrated steel guitar has five foot pedals 45 each of which is connected to various slide members 46 in the same or similar fashion to the connection of the handles 15, 16, and 17 to the slide members 12. In the case of FIG. 3, the connection may be by means of cords 47 each of which extends through a circuitons path around pulleys ending up with the cord extending to its connection to the slide member in the direction of the longitudinal movement of the slide members 46. Each of the slide members 46 is retained in an initial starting position by means of the spring bias of tension springs 50 each of which is connected to a respective one of the slide members 46 at one end and its other end is connected to a J-bolt 51, the J-bolt being mounted on the housing 40. Thus, the tension springs 50 function to locate the slide members in a resting position which represents the unactuated position of the foot pedal 45. The embodiment of FIGS. 3 and 4 also include stop members 52 which are adjustable as to position. Each of the stop members 52 is mounted on the housing 40 by means of bolts including thumb screws 55 which extend through elongated slots 56 in each of the stop members 52. By releasing the thumb screws 55, repositioning the stop members 52 and retightening the thumb screws, the particular location of the stop with relation to the note being displayed can be determined.

It will be evident from the above description that the present invention provides a slide rule device for visualizing the operation of a fretted stringed instrument and for teaching the operation of a pedal steel guitar. While specific embodiments of the invention have been shown and described, it is to be understood that this is for the purpose of illustration only and the invention is not to be limited thereby, the scope being indicated by the appended claims. For example, one modification that will be evident is the providing of additional handles and repositioned stops to simulate the addition of foot pedals and knee levers and the revision of operation of the same to provide a double or triple raise or lower. It should also be understood that the embodiment of FIGS. 1 and 2 is intended to represent a basic student model pedal steel guitar and that other embodiments of the invention would represent more professional or more advanced instruments having additional foot pedals, strings, knee levers and the like as well as half stops or push through stops.

I claim:

1. A slide rule device for a fretted musical instrument having a plurality of tuned strings and means for changing the tuning of the strings, said slide rule comprising:

a. a housing defining a plurality of side-by-side elongated channels each corresponding to a respective string of the instrument.

b. a plurality of side-by-side elongated slide members positioned in said channels, at least some of said slide members being longitudinally movable, said housing including stops limiting the longitudinal movement of said slide members, each of said slide members having a plurality of notes inscribed thereon with said notes being distributed longitudinally along said slide members, said housing having fret marks inscribed thereon to indicate the frets of the musical instrument with the fret marks being distributed longitudinally relative to the channels.

c. at least one handle connected to at least one of the slide members for moving the slide member longitudinally and representing an element of the musical instrument intended for changing the tuning of at least one of the strings during the playing thereof.

d. and an indicator member having an opening therethrough arranged to display the notes of a chord produced by a series of strings, said housing having a surface adapted to support said indicator member to extend over and perpendicular to said channels, said indicator member having marks adapted to be lined up with the fret marks on the housing so as to display the notes corresponding to respective frets.

2. The slide rule device of claim 1 wherein said handle represents a foot pedal and is connected to two of said slide members, said slide members being movable by said handle between two positions in one of which the notes displayed through the indicator opening represent the foot pedal depressed and in the other of which the notes displayed through the indicator opening represent the foot pedal released.

3. The slide rule device of claim 1 wherein said handle is connected to two of said slide members, said slide members being movable by said handle from a first position through a second position and to a third position, said slide members, when in said first position, displaying notes through the indicator opening representing the handle fully depressed and, when in said second position, displaying notes through the indicator opening representing the handle partially depressed and, when in said third position, displaying notes through the indicator opening representing the handle fully released.

4. The slide rule device of claim 1 wherein said indicator member has an opening which displays the notes of three selected strings.

5. The slide rule device of claim 1 wherein there are a plurality of handles, one of said handles being connected to a first and second of said slide members, another of said handles being connected to two of said slide members one of which is said second slide member and the other of which is a third slide member, said one handle being flexible so as to permit said second slide member to be moved longitudinally when said first slide member is not.

6. The slide rule device of claim 5 wherein said another handle is made in two separate parts so as to permit said second slide member to be moved longitudinally when said third slide member is not.

7. The slide rule device of claim 5 wherein said slide members are movable in one longitudinal direction to represent lowering of tone of the string and are movable in the opposite longitudinal direction to represent the raising of the tone of the string.

8. The slide rule device of claim 1 wherein said stops are adjustable to change the longitudinal travel of said slide members, and additionally includes means for supporting said housing at the normal level a steel guitar is played.

9. The slide rule device of claim 1 additionally comprising springs connected between said slide members and said housing and biasing said slide members agains said stops to a respective position.

10. The slide rule device of claim 9 wherein some of said handles are foot pedals located below said housing for depression by the feet and others of said handles are knee levers located at the level of the knee for actuation by the knee.

11. The slide rule device of claim 1 wherein said handle represents a knee lever and is connected to two of said slide members, said slide members being movable by said handle between two positions in one of which the notes displayed through the indicator opening represent the knee lever depressed and in the other of which the notes displayed through the indicator opening represent the knee lever released.

* * * * *